Dec. 1, 1936.   H. S. JANDUS ET AL   2,062,313
VEHICLE BUMPER CONSTRUCTION
Filed Feb. 23, 1934
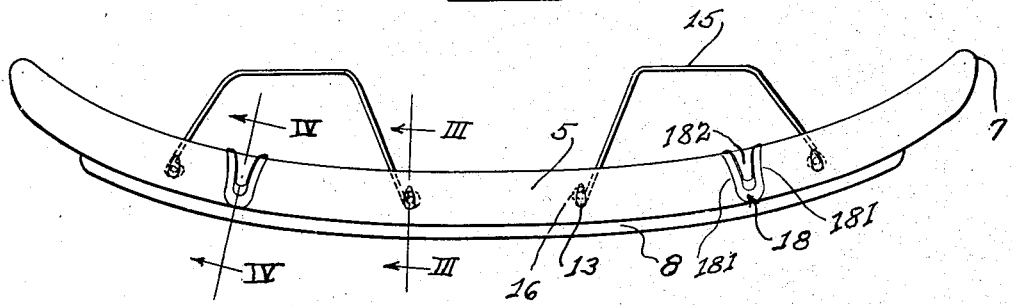
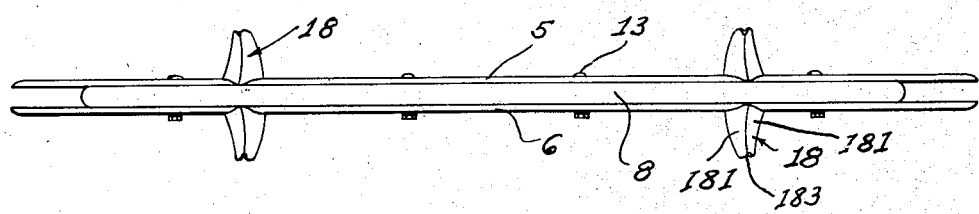
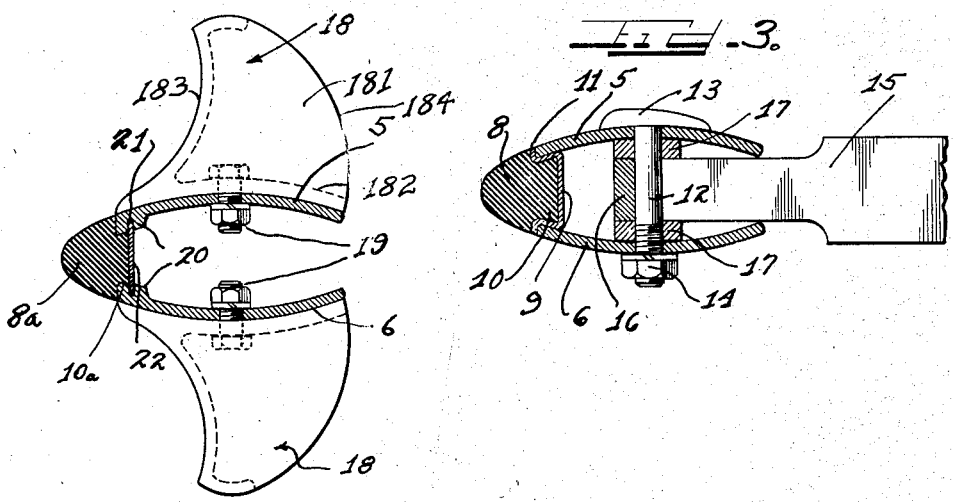
Inventors
Herbert S. Jandus.
Bladen M. Short.
by Charles H. Wills Attys.

Patented Dec. 1, 1936

2,062,313

UNITED STATES PATENT OFFICE 2,062,313

VEHICLE BUMPER CONSTRUCTION

Herbert S. Jandus and Bladen M. Short, Detroit, Mich., assignors to General Spring Bumper Corporation, Detroit, Mich., a corporation of Michigan Application February 23, 1934, Serial No. 712,470

10 Claims. (Cl. 293—55)

This invention relates to improvements in vehicle bumpers and a method of making the same, the invention being highly desirable in connection with the manufacture and use of automotive vehicle bumpers for either the front or rear of the car, although the invention may have other uses and purposes as will be apparent to one skilled in the art.

In the automobile industry, the present trend is towards pronounced streamlining not only as to the vehicle body proper, but also as to all of the so-called accessories, commonly carried by the vehicle. Accordingly, it is desirable to have such a streamlining effect in the bumper.

In the past, difficulty has been experienced in an endeavor to reach a happy medium between sufficient strength and rigidity and lightness in weight. It is also desirable at the present time, to provide a bumper more proficient in its shock absorbing capabilities and difficulty has also been experienced in endeavoring to accomplish this result without detracting from the appearance of the bumper and in keeping the bumper and its mounting means to a size within reasonable limits.

Heretofore, the practice has been to provide bumpers with buffer clamps or brackets to prevent bumpers on meeting vehicles from becoming interlocked with each other. All of these buffer plates of which we are aware have been full-sized buffer clamps extending both above and below the vehicle bumper and attachable to the vehicle bumper in some particular location, the plates being additional elements added to the bumper after completion of the construction thereof and consequently adding materially to the expense of the bumper and in many cases detracting from the appearance thereof.

With the foregoing in mind, it is, accordingly, an object of this invention to provide a bumper shaped to give a streamline effect, the bumper being provided with a resilient facing adding materially to the shock absorbing capabilities of the bumper, and which facing, instead of detracting from the appearance of the bumper, in fact enhances the beauty and streamline effect of the resultant whole.

It is also an object of this invention to provide a vehicle bumper of much more than necessary and considerably more than average strength and yet relatively light in weight, of reasonable size and excellent appearance.

A further object of this invention is the provision of a vehicle bumper including a plurality of impact bars and facing means, all shaped to provide, when assembled, a uniform streamline effect.

Still another object of this invention is the provision of a bumper of few parts, exceedingly simple to assemble and arranged, when assembled, to provide considerable strength with lightness of construction.

It is also an object of this invention to provide a vehicle bumper of streamline appearance, composing relatively few parts with exposed portions of the parts also streamline in character.

Still a further object of this invention is the provision of a combination vehicle bumper and buffer clamp construction wherein the buffer means may be mounted to extend above or below the bumper and in substantially any desirable location on the bumper as may be desired.

Another object of the invention is the provision of combination bumper and buffer construction wherein the buffer means are preferably secured in position with relative parts of the bumper prior to the assembling of the said bumper parts into the finished bumper.

An additional object of the invention is the provision of a new and novel method of making a vehicle bumper.

While some of the more salient features, characteristics, advantages and process steps embodying this invention have been above pointed out, others will become apparent from the following disclosure.

The invention includes these and other features and steps of construction and combinations of parts hereinafter described, and shown in a preferred form of the drawing, as more particularly indicated by the claims.

On the drawing:

Figure 1 is a plan view of a vehicle bumper including back or cushion bars and embodying principles of the present invention.

Figure 2 is a front elevational view of the structure shown in Figure 1.

Figure 3 is an enlarged, fragmentary, vertical sectional view, with parts in elevation, taken substantially as indicated by line III—III of Figure 1.

Figure 4 is an enlarged vertical sectional view, with parts shown in elevation and parts omitted for the purpose of clarity, taken substantially as indicated by line IV—IV of Figure 1, showing a slightly different form of construction.

As shown on the drawing:

In the illustrated embodiment of the present invention, there is seen a vehicle bumper which includes upper and lower confronting impact plates 5 and 6 respectively. These impact bars are preferably bent edgewise to provide in general a longitudinally arcuate shape, and have their ends trimmed in a somewhat distorted arcuate manner as indicated at 7 to provide a streamline effect. Also in keeping with the streamline effect, the bars 5 and 6 are each preferably arched transversely to thus present convex outer faces and concave inner faces. Of course, such transverse arching of the bars materially adds to their strength without increasing their weight, and in addition, presents an aid in construction and assembly that will be more apparent hereinafter.

Of course, with the impact bars 5 and 6 so arranged in confronting spaced relationship to each other, it is feasible to provide a suitable facing element or strip. This facing strip can, if desired, be of metal and still remain within the teaching of this invention, but in keeping with the modern commercial practice, it is deemed preferable to provide a resilient facing strip 8 made of rubber, rubber composition, or any other suitable material. As seen more clearly in Figure 3, the facing strip 8 or impact receiving element is outwardly arcuate to provide a longitudinally extending nose for the bumper, preferably conforming in curvature with the bars 5 and 6 to enhance the streamline effect. To form an impact receiving unit the facing strip 8 is preferably provided with a backing 9 of metal or some other rigid substance. In the instance shown in Figure 3, the backing 9 is in the form of a steel channel embracing a dovetailed extension 10 of the facing strip 8. The backing 9 may, if so desired, be clamped to the facing strip 8 but it is deemed better practice to bond the backing to the strip. This bonding may be accomplished by the now known practice of vulcanizing rubber to steel. The backing 9 is shaped on its lateral surfaces to fit the interior concavities of the impact bars 5 and 6, and in the illustrated instance, the backing is also outwardly flanged as at 11 to overlie the forward edges of the bars 5 and 6 to render a completely symmetrical appearance.

It will, of course, be understood that the facing element or impact receiving unit hereinabove described need not be one elongated unit as shown, but might, in any well-known manner, be made of a plurality of shorter separated units.

To hold the bars and impact receiving unit in proper position, the bars are preferably clamped over the impact receiving unit by means of spaced bolts 12 extending through suitable apertures in the bars. Each bolt 12 is provided with a streamlined head 13 and is held in position by a nut and lock washer connection 14 on the underside of the bumper. The bumper is provided with any suitable form of back or cushion bars 15, these bars being in this instance shown as substantially U-shaped, each leg of which is provided at its forward end with a suitable loop 16 engaged around one of the bolts 12. The forward end of each leg upon the cushion bars 15 is preferably reduced as seen in Figure 3 to extend between the impact bars 5 and 6 and thus embrace the respective bolt 12. Between such a loop 16 and the bars 5 and 6 suitable washers or spacing elements 17 are provided to maintain the bars 5 and 6 a proper distance apart and still provide a solid and rigid construction with the impact receiving means firmly clamped between the bars.

Bumper guards or brackets 18 are also provided with the bumper above described and in the present instance form a novel structural combination with the bumper. Each guard 18 extends only in one direction either above or below the bumper, and each is formed in a winged streamline shape having a hollow interior (Figure 4) and a bottom or seat portion 182 curved for intimate engagement over the convex surface of the respective impact bar 5 or 6 as the case may be. A bolt and nut connection 19 between the wings 181 of a guard 18, the bolt passing through a suitable aperture in the bottom of the bracket and the respective bar 5 or 6, securely holds the bracket in proper position upon the bumper. If so desired, the guards may be disposed as seen in Figures 2 and 4 with an upper guard in alignment with the lower guard, but it is obvious that only upper or lower guards may be used or the upper guards may be out of alignment with the lower guards. It is also apparent that by the simple facility of drilling a hole in one of the impact bars 5 or 6, the guards 18 may be disposed at any desirable location along the bumper.

As will be observed, the wings of each guard 18 form together a converged face with inclined side impact surface portions 181 which will cam aside colliding objects. The free end of each guard projects forwardly as at 183 and will limit relative vertical movement between the guard and such objects in one direction. The guard, rearwardly of the free end 183, has an inclined surface 184 which will cam a bumper interlocked therewith vertically in a direction to unlock the same upon forward pull of such bumper against the cam surface. These features as well as those set forth above with respect to the guard are easily discernible in Figures 1, 2 and 4.

The bumper construction described hereinabove lends itself to a new method of making, or more specifically, to a new method of assembly. The facing unit 8, with or without the backing 9 is individually formed, as is each of the impact bars 5 and 6. After the forming and finishing of these respective parts, the bars 5 and 6 are clamped over the unit by means of the bolts 12 in the manner previously described. The buffer brackets 18, as aforesaid, are so designed as to be individually attachable to the impact bars 5 and 6 prior to the assembly of these bars and the facing unit into a complete bumper.

In Figure 4, we have shown a slightly different construction for the front of the bumper, wherein the forward margins of the impact bars 5 and 6 are thickened to provide inwardly extending portions 20 each of which portions is provided with a longitudinally extending groove 21. A facing strip 8a having a dovetailed extension 10a extending between the bars 5 and 6 and having substantially the same contour as the facing strip 8 above described, is utilized in this instance. However, in this instance, a backing 22 consisting of a rigid strip, preferably metal, is secured to the facing strip 8a in any desired manner, or better by bonding as aforesaid. The backing 22 extends above and below the portion 10a of the facing strip so as to seat within the grooves 21 in the thickened portion 20 of the bars 5 and 6. Of course, the facing unit is then firmly held in position when the bars 5 and 6 are clamped thereupon as above set forth by means of the bolts 12.

It is obvious that the construction shown in Figure 4 lends itself to the same novel method of making or assembly as does the construction in Figures 1, 2 and 3.

From the foregoing, it is apparent that we have provided a bumper construction which is not only extremely light in weight, exceptionally strong, and possessed of shock absorbing capabilities, but also presents a streamline effect which will greatly enhance the appearance of the vehicle upon which it is mounted. It will further be noted that the bumper may be provided with buffer brackets in a simple expeditious manner and at any desired point, the brackets extending above or below the bumper as may be desired. Furthermore, the bumper construction made under the principles of this invention is simple in construction and economical to manufacture under the new and novel method presented herein for making and assembling the bumper or under some other method.

We are aware that changes may be made and numerous details of construction may be varied through a wide range without departing from the principles of this invention, and we, therefore, do not purpose limiting the patent granted hereon otherwise than is necessitated by the scope of the appended claims.

We claim as our invention:

1. In a vehicle bumper, a pair of confronting impact bars having opposed grooves in their inner faces, a facing element of resilient material, a rigid backing on said element between said bars and seated in said grooves, and means to maintain said bars clamped on said backing.

2. In a vehicle bumper, a pair of confronting impact bars, a facing element disposed between said bars, clamping means holding the bars clamped against said facing element, and a cushion bar also extending between said confronting bars and kept in position by said clamping means.

3. Bumper construction comprising a pair of impact bars, a cushion element disposed between the forward parts of said bars, a bumper bar guard mounted on one of said bars and extending vertically substantially beyond said one bar to prevent another bumper from riding said one bar, and means shielded by said guard and mounting the guard on said bar.

4. Bumper construction comprising a pair of impact bars, a cushion element disposed between the forward parts of said bars, a bumper bar guard mounted on one of said bars and extending vertically substantially beyond said one bar to prevent another bumper from riding said one bar, and means shielded by said bars, element and guard and mounting the guard on said bar.

5. A cushioning unit for a bumper and including a relatively rigid rear attaching and reinforcing part and a relatively elastic front buffer part providing recesses at the upper and lower portions thereof, upper and lower impact bars projecting into the respective recesses, and means clamping said bars and unit in the relation mentioned, said front part projecting forwardly of said bars to yieldably shield the same.

6. Bumper construction comprising a pair of impact bars, a cushion impact element disposed between the forward parts of said bars, a bumper bar guard extending vertically substantially beyond one of said bars to prevent another bumper from riding on said one bar, and means shielded by said guard and mounting the guard in position.

7. A bumper assembly comprising a pair of vertically spaced opposed transversely curved impact bars presenting opposed inner concave faces and upper and lower convex outer faces of substantial width, an impact element of resilient material carried by said bars and having a portion disposed protecting an edge of said bars, and means retaining said bars in assembled relation.

8. A bumper assembly comprising a pair of vertically spaced opposed transversely curved impact bars presenting opposed inner concave faces and upper and lower outer convex faces of substantial width, an impact element of resilient material clamped between said pair of bars and extending outwardly thereof, and means to retain said bars and said impact element in assembled relation.

9. In a bumper assembly comprising a pair of vertically spaced opposed bars arranged presenting upper and lower horizontally extending outer faces of substantial width, a guard having a horizontally extending base adapted to seat on one of said faces, said guard having a pair of wings extending vertically from and integral and substantially longitudinally coextensive with said base and disposed to provide converging impact faces projecting vertically from the outer face of the bar.

10. In a bumper guard assembly comprising a pair of vertically spaced bars arranged presenting upper and lower horizontally extending outer faces of substantial width, a guard having a horizontally extending base adapted to seat on one of said faces, said guard having a pair of converging wings extending vertically from and substantially longitudinally coextensive with said base, said wings being each shaped to define a rearwardly extending cam surface at their free edge and being disposed to project vertically from the outer face of the bar.

HERBERT S. JANDUS.
BLADEN M. SHORT.